United States Patent [19]

Raineri

[11] Patent Number: 4,522,552
[45] Date of Patent: Jun. 11, 1985

[54] COMBINE HARVESTERS

[75] Inventor: Giuseppe Raineri, Bassano del Grappa, Italy

[73] Assignee: Pietro Laverda S.p.A., Breganze, Italy

[21] Appl. No.: 498,439

[22] Filed: May 26, 1983

[30] Foreign Application Priority Data

Jun. 3, 1982 [IT] Italy ............................. 67715 A/82

[51] Int. Cl.³ .............................................. B60P 1/40
[52] U.S. Cl. ................................... 414/523; 198/316; 198/865
[58] Field of Search ............... 414/523, 503, 504, 505; 198/312, 315, 316, 317, 318, 865; 406/43; 137/615; 292/219, 225, 228; 298/38; 105/395

[56] References Cited

U.S. PATENT DOCUMENTS

| 2,783,907 | 3/1957 | Hudgins | 414/505 |
| 3,521,768 | 7/1970 | Rohwedder | 198/865 X |
| 3,721,359 | 3/1973 | Howell et al. | 414/523 X |
| 4,067,597 | 1/1978 | Lawrence | 292/228 |
| 4,194,787 | 3/1980 | Williamsen | 105/261 A |
| 4,225,282 | 9/1980 | Nordstrom et al. | 414/694 |
| 4,390,094 | 6/1983 | Schoenberger | 414/504 X |
| 4,391,363 | 7/1983 | Waldrop | 414/504 X |
| 4,391,364 | 7/1983 | Young et al. | 414/503 X |
| 4,459,079 | 7/1984 | Brelsford et al. | 414/523 X |

Primary Examiner—Joseph E. Valenza
Assistant Examiner—Stuart J. Millman
Attorney, Agent, or Firm—Sughrue, Mion, Zinn, Macpeak and Seas

[57] ABSTRACT

A combine harvester is provided with an orientable tube for discharging grain from its tank and a hydraulic jack for moving the orientable discharge tube between its extended position in which it projects from the combine harvester, and its retracted position in which the orientable discharge tube is housed within the space occupied by the combine harvester. The latter is further provided with catch means which are snap-engaged by the discharge tube when it is brought into its retracted position so that the discharge tube remains locked in this retracted position, and hydraulically controlled actuator means for releasing the catch means when the hydraulic jack moves the discharge tube towards the extended position.

2 Claims, 5 Drawing Figures

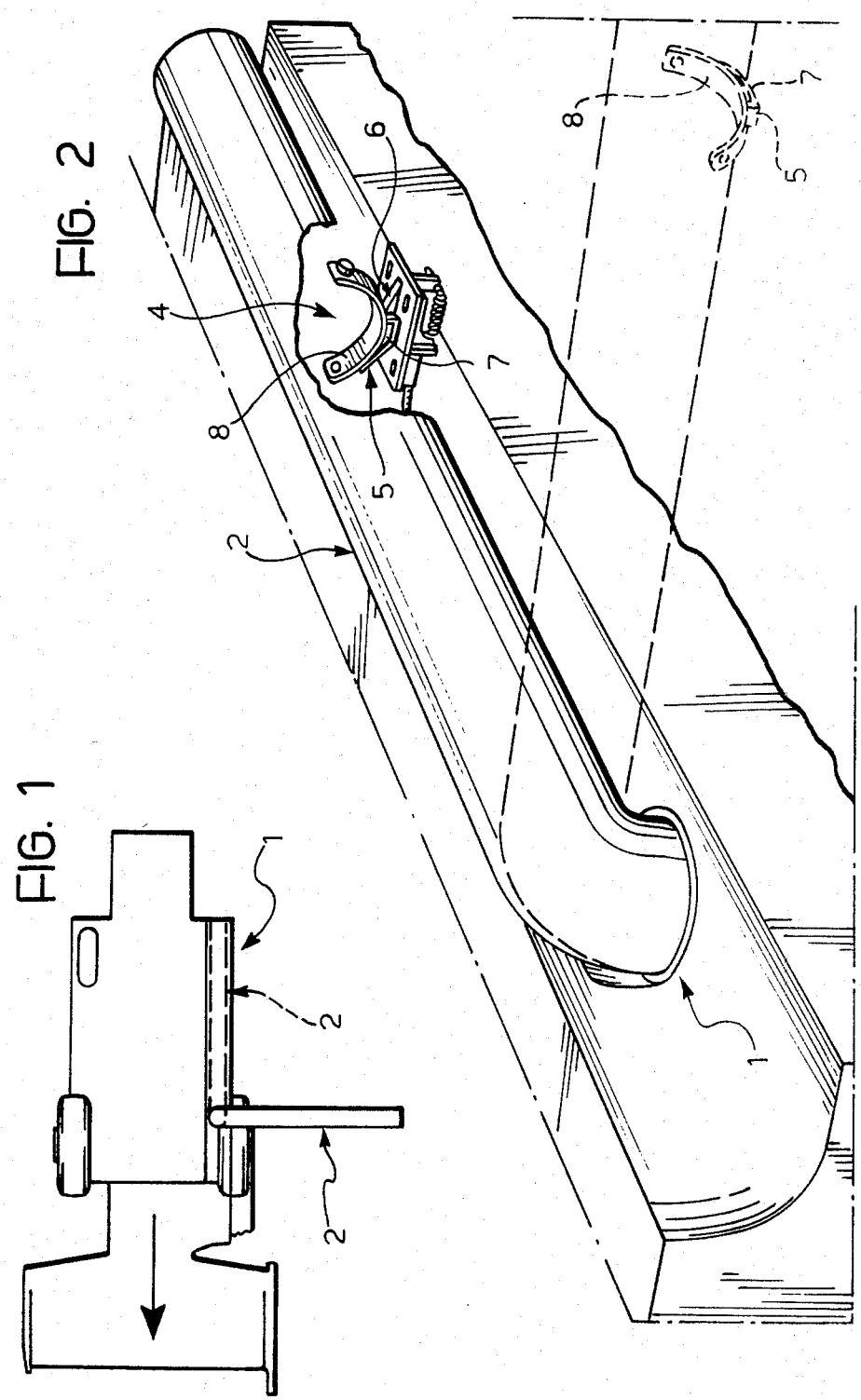

COMBINE HARVESTERS

The present invention relates to combine harvesters of the type having an orientable tube for discharging grain from its tank, and a hydraulic jack for moving the orientable discharge tube between an extended position in which it projects from the combine harvester, and a retracted position in which the orientable discharge tube is housed within the space occupied by the combine harvester.

Combine harvesters of the aforesaid type are known in which the discharge tube is locked in its retracted position, for safety reasons, by means of a manually operated device such as, for example, a latch, a hook device or the like.

The main characteristic of the combine harvester according to the invention lies in the fact that it is provided with catch means which are snap-engaged by the orientable discharge tube when it is brought into its retracted position so that the discharge tube remains locked in this retracted position, and hydraulically controlled actuator means for releasing the catch means when the hydraulic jack moves the discharge tube towards the extended position.

According to a further characteristic, the catch means comprise a catch member carried by the structure of the machine for cooperation with a striker member carried by the discharge tube to lock the discharge tube in its retracted position, and resilient means biassing the catch member into an active position of restraining the striker member. The striker member and the catch member have cam surfaces for allowing snap-engagement when the orientable discharge tube is brought into its retracted position.

A further characteristic of the invention lies in the fact that the actuator means comprise a single-acting hydraulic cylinder arranged to move the catch member away from its active restraining position against the action of the resilient means, and in that the working chamber of this single-acting hydraulic cylinder is in communication with that chamber of the hydraulic jack which is supplied with pressurised fluid when it moves the orientable discharge tube towards its extended position.

By virtue of this characteristic, the releasing of the catch device is achieved with the use of the hydraulic servocontrol which moves the discharge tube.

Further characteristics and advantages of the present invention will emerge from the description which follows with reference to the appended drawings, provided purely by way of non-limiting example, in which:

FIG. 1 is a schematic plan view illustrating a combine harvester provided with an orientable discharge tube for discharging grain from its tank;

FIG. 2 is a perspective view illustrating a preferred embodiment of the device forming the subject of the present invention;

FIG. 1 is a plan view of a combine harvester 1 including a tank (not illustrated) for collecting the grain, and an orientable discharge tube 2 for discharging the grain from the tank.

Figure 5:
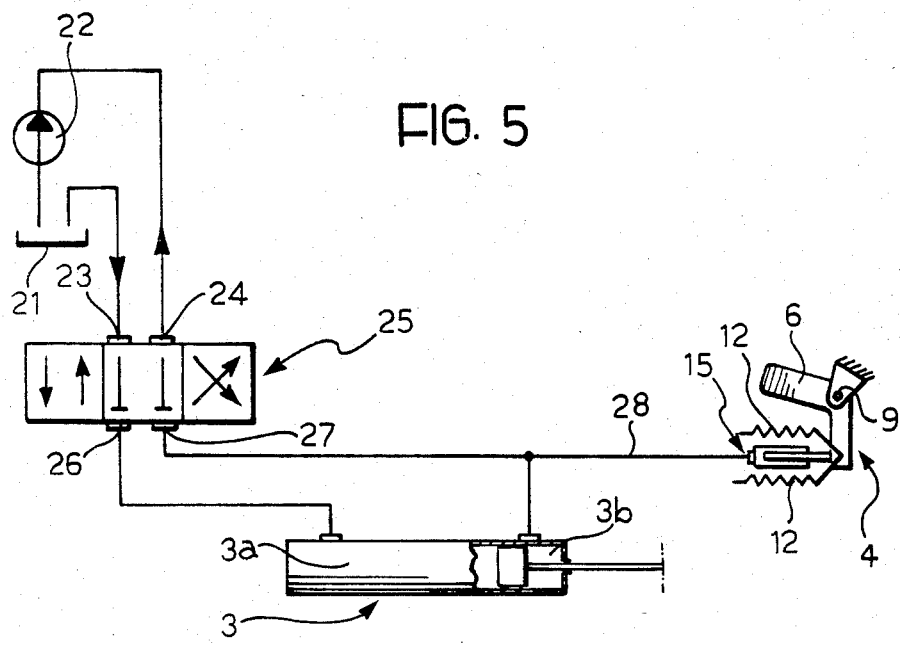
FIG. 5 illustrates schematically the hydraulic control circuit associated with the device according to the invention.

The orientable discharge tube 2 is displaceable by means of a double-acting hydraulic jack 3, not illustrated in FIG. 1, see FIG. 5, between an extended position (illustrated in continuous outline in FIG. 1) in which the discharge tube projects from the combine harvester, and a retracted position (illustrated in broken outline in FIG. 1) in which the discharge tube is housed within the space occupied by the combine harvester.

Figure 3:
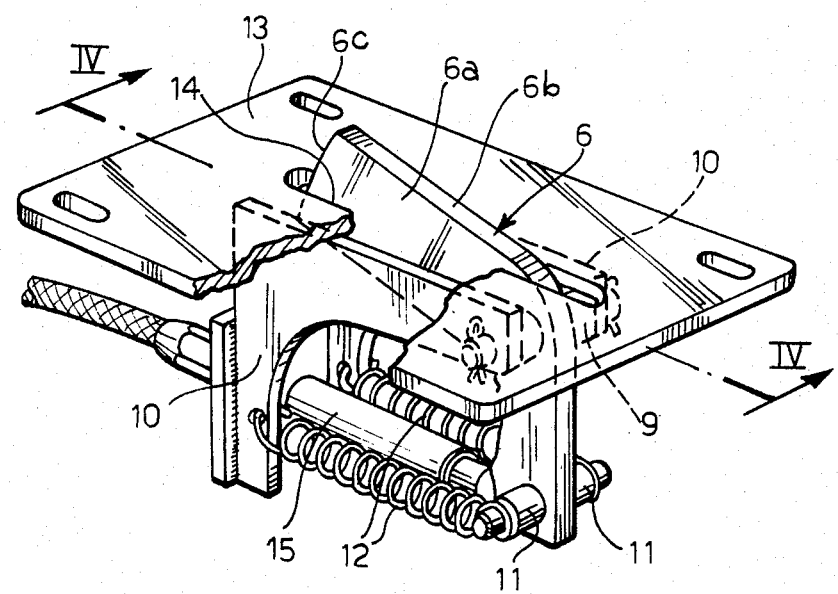
FIG. 3 illustrates a detail of FIG. 2 on an enlarged scale.

FIGS. 2 and 3 illustrate a safety device 4 for locking the orientable discharge tube 2 in its retracted position.

FIG. 2 is a perspective view showing the discharge tube in its retracted position (in continuous outline) and in its extended position (in broken outline).

The catch device 4 includes a striker member 5 carried by the discharge tube 2, and a catch member 6 (see also FIG. 3) carried by the structure of the combine harvester and arranged to cooperate with the striker member 5 to lock the latter in the retracted position of the discharge tube.

The striker member 5 is constituted by a bracket which has an inclined part 7 and is welded to an arcuate plate 8 the lower part of which is bolted to the outer surface of the discharge tube 2.

As illustrated in detail in FIG. 3, the catch member 6 is constituted by a substantially L-shaped lever pivoted about a pin 9 the ends of which are carried by two brackets 10 fixed to the structure of the harvester. One of the ends of the L-shaped lever 6 has two cylindrical projections 11 to which the ends of two helical springs 12 are fixed. The opposite ends of the springs 12 are connected to the two brackets 10.

The springs 10 bias the catch lever 6 into an active position in which it restrains the striker member 5. In this position, the lever 6 has an active part 6a which projects above a plate 13 fixed to the structure of the harvester through a slot 14 formed in the plate 13.

In the active restraining position, the active part 6a of the catch lever 6 has an inclined edge 6b which is adapted to cooperate with the inclined part 7 of the bracket constituting the striker member 5, so as to cause the snap-engagement of the striker member 5 with the catch member 6 when the discharge tube is brought into its retracted position by means of the hydraulic control jack 3.

The catch device 4 further includes a single-acting hydraulic cylinder 15 (see also FIG. 4) having a body 16 carried by a plate 17 welded to the two brackets 10, and a shaft 18 having a free end which is in contact with the end of the lever 6 to which the two springs 12 are connected.

Figure 4:
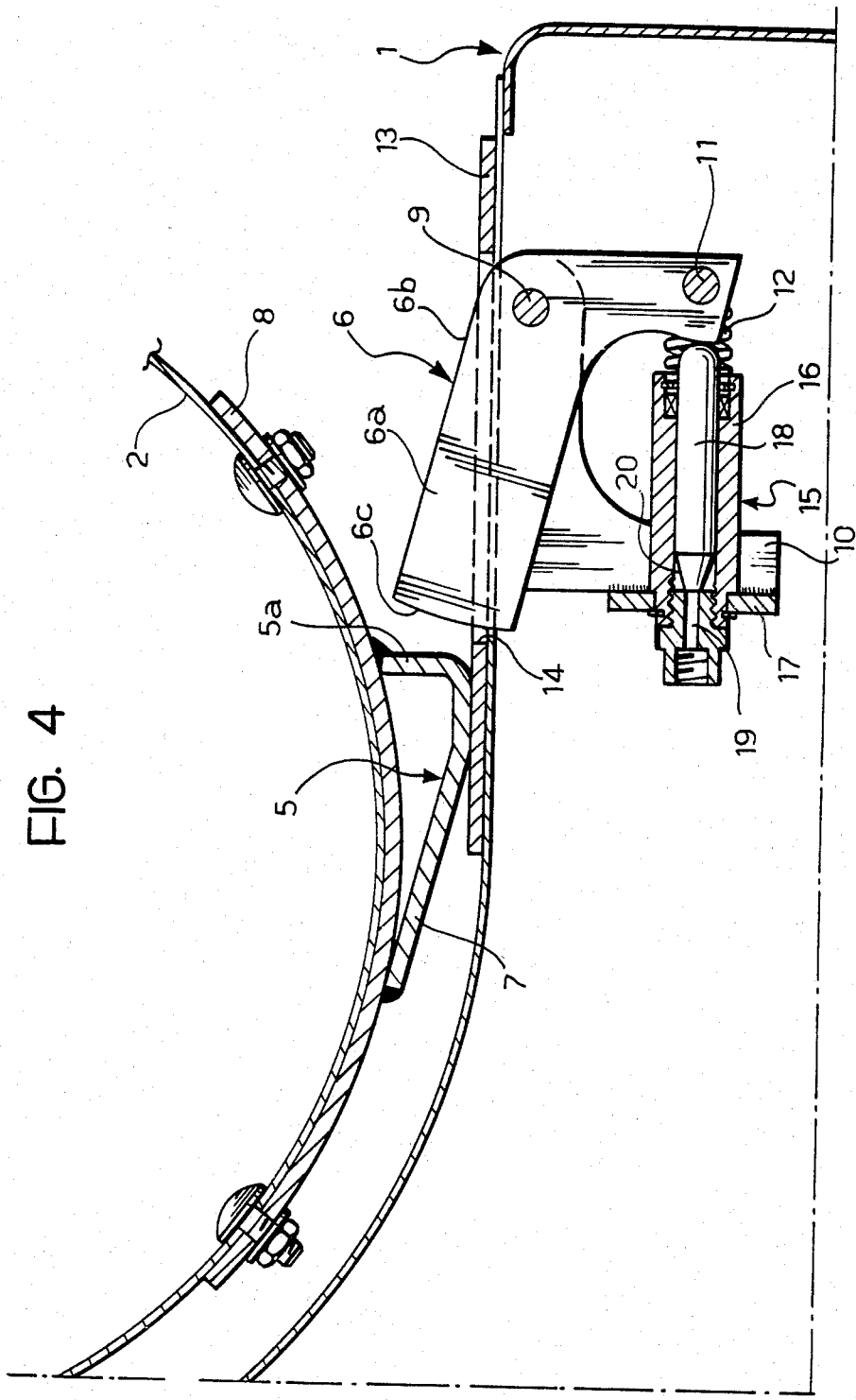
FIG. 4 is a sectional view taken on the line IV—IV of FIG. 3.

The helical springs 12 bias the catch lever 6 into its active restraining position illustrated in FIGS. 3 and 4. This position is defined by the abutment of the lever 6 against the shaft 18 of the hydraulic cylinder 15.

FIG. 4 also illustrates the connector 19 for supplying pressurized fluid to the working chamber 20 of the hydraulic cylinder 15.

FIG. 5 illustrates schematically the catch device 4 and that part of the hydraulic circuit of the combine harvester associated therewith.

A tank 21 and a pump 22 are connected to respective inlets 23, 24 of a hydraulic distributor 25 which controls the supply of pressurized fluid to the two chambers 3a, 3b of the hydraulic jack 3.

In known manner, the hydraulic distributor 25 has a central neutral position and two operative end positions.

In one of these operative end positions, the two inlets 23, 24 of the hydraulic distributor 25 are connected respectively to two outlets 26, 27 which communicate with the two chambers 3a, 3b of the hydraulic jack 3. In the other operative end position, these connections are reversed.

The extending movement of the orientable discharge tube 2 is effected by the supply of pressurized fluid to the chamber 3b of the hydraulic jack 3.

This chamber 3b communicates through a line 28 with the supply connector 19 of the hydraulic cylinder 15.

The operation of the catch device described is as follows:

When the orientable discharge tube 2 is moved from the extended position to the retracted position, pressurized fluid is supplied through the hydraulic distributor 25 from the pump 22 to the chamber 3a of the hydraulic jack 3. Under these conditions, the chamber 3b and, consequently, also the working chamber 20 of the hydraulic cylinder 15 are connected to the drain tank 21.

When the discharge tube reaches a position close to its retracted position, the lever 6 is in the position illustrated in FIGS. 3 and 4. The inclined part 7 of the bracket constituting the striker member 5 engages the corresponding inclined edge 6b of the catch member 6, causing the rotation of the lever 6 about its pivot pin 9 in an anti-clockwise sense (with reference to FIG. 4) against the action of the helical springs 12. The striker member may thus reach the position illustrated in FIG. 4, corresponding to the retracted position of the discharge tube 2. The lever 6 is stopped in this position as a result of its engagement against the free end of the shaft 18 of the hydraulic cylinder 15.

Once the striker member 5 has snap-engaged with the catch member 6, the discharge tube 2 is locked in its retracted position. Any accidental movement towards the extended position of the discharge tube is, in fact, prevented by the engagement of the part of the bracket 5 indicated by the reference numeral 5a against the edge 6c of the lever 6 (see FIG. 4).

When the orientable discharge tube 2 is moved from its retracted position towards its extended position, pressurized fluid is fed through the hydraulic distributor 25 from the pump 22 to the chamber 3b of the hydraulic jack 3. Under these conditions, as a result of the connection constituted by the line 28, pressurized fluid is also fed to the working chamber 20 of the hydraulic cylinder 15. The shaft 18 of this cylinder is thus moved towards the right (with reference to FIG. 4), causing the movement of the catch lever 6 away from its active restraining position against the action of the helical springs 12. The cylinder 15 carries the lever 6 into a position in which the active part 6a does not project above the plate 13, so that the striker member 5 is free to slide on this plate allowing the discharge tube to move away from its retracted position. As long as the discharge tube remains in its extended position, the chamber 20 of the cylinder 15 is pressurized and the shaft 18 remains in the extended condition. When the discharge tube is again retracted, the chamber 20 of the hydraulic cylinder 15 is connected, as already explained, to the drain tank 21, so that the shaft 18 returns to the position illustrated in FIG. 4 and the lever 6 readopts its active restraining position.

Naturally, the principle of the invention remaining the same, the details of construction and forms of embodiment may be varied widely with respect to that described and illustrated purely by way of example, without thereby departing from the scope of the present invention.

I claim:

1. A combine harvester including a grain storage tank, an orientable discharge tube for discharging grain from the tank, and a hydraulic jack for moving the discharge tube between an extended position in which it projects from the combine harvester, and a retracted position in which it is housed within the space occupied by the combine harvester, wherein the improvement comprises catch means which are snap-engageable by the discharge tube when the latter is brought into its retracted position so as to lock the discharge tube in this retracted position and hydraulically controlled actuator means for releasing the catch means when the hydraulic jack moves the discharge tube towards the extended position, wherein the said catch means includes a catch member carried by the structure of the combine harvester, a striker member carried by the discharge tube for cooperation with the catch member to lock the discharge tube in its retracted position, and resilient means biassing the catch member towards an active position of restraining the striker member, said striker member and said catch member having respective cam surfaces arranged to cooperate with each other to allow snap-engagement when the discharge tube is brought into its retracted position, and wherein said actuator means includes a single-acting hydraulic cylinder arranged to move the catch member away from its active restraining position against the action of the resilient means, said single-acting hydraulic cylinder having an active chamber which communicates with the chamber of the hydraulic jack which is supplied with pressurized fluid when the hydraulic jack moves the discharge tube towards its extended position.

2. A combine harvester as defined in claim 1, wherein a plate defining a slot is fixed to the structure of the combine harvester, the catch member comprises a lever pivoted to the structure and having an active part which projects above the plate through said slot when the catch member is in its active restraining position, the striker member comprises a bracket with an inclined portion, and the active part of the lever has an inclined edge which cooperates with the inclined portion of the bracket in the active restraining position.

* * * * *